(12) United States Patent
Facini et al.

(10) Patent No.: US 10,706,470 B2
(45) Date of Patent: Jul. 7, 2020

(54) SYSTEMS AND METHODS FOR PROCESSING FULL OR PARTIALLY DISPLAYED DYNAMIC PEG ORDERS IN AN ELECTRONIC TRADING SYSTEM

(71) Applicant: IEX GROUP, INC., New York, NY (US)

(72) Inventors: Adrian Facini, Brooklyn, NY (US); Francis Chung, New York, NY (US); Daniel Aisen, New York, NY (US); Robert Park, New York, NY (US); Bradley Katsuyama, New York, NY (US); Constantine Sokoloff, Jersey City, NJ (US)

(73) Assignee: IEX Group, Inc., New York, NY (US)

( * ) Notice: Subject to any disclaimer, the term of this patent is extended or adjusted under 35 U.S.C. 154(b) by 0 days.

(21) Appl. No.: 15/368,010

(22) Filed: Dec. 2, 2016

(65) Prior Publication Data
US 2018/0158141 A1 Jun. 7, 2018

(51) Int. Cl.
*G06Q 30/08* (2012.01)
*G06Q 40/04* (2012.01)

(52) U.S. Cl.
CPC .............. *G06Q 40/04* (2013.01); *G06Q 30/08* (2013.01)

(58) Field of Classification Search
CPC ..................................................... G06Q 40/04
See application file for complete search history.

(56) References Cited

U.S. PATENT DOCUMENTS

| | | |
|---|---|---|
| 4,736,294 A | 4/1988 | Gill et al. |
| 8,301,547 B2 | 10/2012 | Sulavka |
| 8,489,747 B2 | 7/2013 | Aisen et al. |
| 8,589,260 B2 | 11/2013 | Chambers et al. |
| 8,984,137 B2 | 3/2015 | Aisen et al. |
| 9,082,119 B2 | 7/2015 | Ortiz et al. |
| 9,922,436 B2 | 3/2018 | Iannaccone et al. |

(Continued)

FOREIGN PATENT DOCUMENTS

| | | |
|---|---|---|
| AU | 2010330629 B2 | 2/2012 |
| AU | 2016200212 A1 | 2/2016 |

(Continued)

OTHER PUBLICATIONS

Elvis Picardo, An Introduction to Dark Pools, Investopedia, 2014 (Year: 2014).*

(Continued)

*Primary Examiner* — Arunava Chakravarti
(74) *Attorney, Agent, or Firm* — Goodwin Procter LLP

(57) ABSTRACT

A specialized memory structure is provided for storing parts of orders received at an electronic trading system. A received order is divided into a displayed portion and a non-displayed portion, and each portion is allocated to a respective part of the memory structure. The memory structure is configured such that while matching the order with a contra order, priority is given to the displayed portion over the non-displayed portion. If such a match occurs, the displayed portion may be replenished. The matching in the non-displayed portion generally occurs according to rules of applying discretion. The matching in the displayed portion may occur at the displayed price or according to the rules of discretion.

29 Claims, 11 Drawing Sheets

(56) References Cited

U.S. PATENT DOCUMENTS

| | | | |
|---|---|---|---|
| 9,928,548 B2 | 3/2018 | Schmidt et al. | |
| 9,940,670 B2 | 4/2018 | Aisen et al. | |
| 9,959,572 B2 | 5/2018 | Iannaccone et al. | |
| 10,127,612 B2 | 11/2018 | Mannix | |
| 2007/0198397 A1 | 8/2007 | McGinley et al. | |
| 2009/0089199 A1* | 4/2009 | Waelbroeck | G06Q 10/0637 705/37 |
| 2009/0222640 A1* | 9/2009 | Bauman | G06F 9/5077 711/173 |
| 2010/0076887 A1* | 3/2010 | Cushing | G06Q 30/08 705/37 |
| 2010/0332650 A1 | 12/2010 | Aisen et al. | |
| 2012/0166327 A1 | 6/2012 | Amicangioli | |
| 2012/0219283 A1 | 8/2012 | Sokolowski | |
| 2012/0271752 A1* | 10/2012 | Mahoney | G06Q 40/04 705/37 |
| 2012/0271755 A1* | 10/2012 | Milne | G06Q 40/04 705/37 |
| 2014/0019323 A1 | 1/2014 | Blake | |
| 2014/0279552 A1 | 9/2014 | Ortiz et al. | |
| 2014/0372702 A1* | 12/2014 | Subramanyam | G06F 12/0848 711/129 |
| 2015/0235212 A1 | 8/2015 | Ortiz et al. | |
| 2016/0019536 A1 | 1/2016 | Ortiz et al. | |
| 2016/0104155 A1 | 4/2016 | McGaugh et al. | |
| 2016/0173364 A1 | 6/2016 | Pitio et al. | |
| 2016/0182330 A1 | 6/2016 | Iannaccone et al. | |
| 2016/0189260 A1 | 6/2016 | Nagla | |
| 2016/0205174 A1 | 7/2016 | Pitio et al. | |
| 2016/0210626 A1 | 7/2016 | Ortiz et al. | |
| 2016/0260173 A1 | 9/2016 | Aisen et al. | |
| 2016/0267082 A1 | 9/2016 | Wong et al. | |
| 2016/0277348 A1 | 9/2016 | Pitio | |
| 2017/0017958 A1 | 1/2017 | Scott et al. | |
| 2017/0039648 A1 | 2/2017 | Aisen et al. | |
| 2017/0097973 A1 | 4/2017 | Iannaccone et al. | |
| 2017/0124494 A1 | 5/2017 | Hristoskov et al. | |
| 2017/0161735 A1 | 6/2017 | Ortiz et al. | |
| 2017/0186085 A1 | 6/2017 | Nagla | |
| 2017/0249622 A1 | 8/2017 | Ortiz et al. | |
| 2017/0279736 A1 | 9/2017 | Pitio et al. | |
| 2017/0330181 A1 | 11/2017 | Ortiz | |
| 2018/0018723 A1 | 1/2018 | Nagla et al. | |
| 2018/0047065 A1 | 2/2018 | Wildberger | |
| 2018/0054363 A1 | 2/2018 | Ngampornsukswadi et al. | |
| 2018/0075527 A1 | 3/2018 | Nagla et al. | |
| 2018/0082678 A1 | 3/2018 | Olmstead et al. | |
| 2018/0158143 A1 | 6/2018 | Schmitt et al. | |
| 2019/0087898 A1 | 3/2019 | Mannix | |

FOREIGN PATENT DOCUMENTS

| | | |
|---|---|---|
| AU | 2016231624 A1 | 10/2016 |
| AU | 2015327722 A1 | 4/2017 |
| AU | 2015330644 A1 | 4/2017 |
| AU | 2016208989 A1 | 8/2017 |
| AU | 2016224908 A1 | 9/2017 |
| AU | 2016287789 A1 | 2/2018 |
| BR | 112012013891 A2 | 5/2016 |
| CA | 2707196 A1 | 1/2011 |
| CA | 2927532 A1 | 1/2011 |
| CA | 2927607 A1 | 1/2011 |
| CA | 2681251 A1 | 3/2011 |
| CA | 2706252 A1 | 3/2011 |
| CA | 2777438 A1 | 11/2012 |
| CA | 2830260 A1 | 4/2014 |
| CA | 2844318 A1 | 9/2014 |
| CA | 2961916 A1 | 4/2016 |
| CA | 2963287 A1 | 4/2016 |
| CA | 2913700 A1 | 6/2016 |
| CA | 2916284 A1 | 6/2016 |
| CA | 2970743 A1 | 6/2016 |
| CA | 2974151 A1 | 7/2016 |
| CA | 2922072 A1 | 8/2016 |
| CA | 2978488 A1 | 9/2016 |
| CA | 2980196 A1 | 9/2016 |
| CA | 2991073 A1 | 1/2017 |
| CA | 2910754 A1 | 4/2017 |
| CA | 3000464 A1 | 4/2017 |
| CA | 3000466 A1 | 4/2017 |
| CA | 2952874 A1 | 6/2017 |
| CA | 2970686 A1 | 12/2017 |
| CA | 2976505 A1 | 2/2018 |
| CA | 2976618 A1 | 2/2018 |
| CA | 2963767 A1 | 3/2018 |
| CN | 105978756 A | 9/2016 |
| CN | 107004190 A | 8/2017 |
| CN | 107004195 A | 8/2017 |
| CN | 107408253 A | 11/2017 |
| EP | 2510451 A1 | 10/2012 |
| EP | 3201856 A1 | 8/2017 |
| EP | 3234792 A1 | 10/2017 |
| EP | 3248159 A1 | 11/2017 |
| EP | 3260979 A1 | 12/2017 |
| EP | 3269090 A1 | 1/2018 |
| EP | 3272082 A1 | 1/2018 |
| EP | 3317833 A1 | 5/2018 |
| KR | 10-2002-0012538 A | 2/2002 |
| KR | 10-2012-0092880 A | 8/2012 |
| KR | 20180026498 A | 3/2018 |
| MX | 2012006659 A | 1/2013 |
| MX | 2017011021 A | 1/2018 |
| SG | 10201704581VA | 7/2017 |
| SG | 11201707004WA | 9/2017 |
| WO | WO-00/50974 A2 | 8/2000 |
| WO | WO-2011/069234 A1 | 6/2011 |
| WO | WO-2016/049745 A1 | 4/2016 |
| WO | WO-2016/054727 A1 | 4/2016 |
| WO | WO-2016/095012 A1 | 6/2016 |
| WO | WO-2016/115620 A1 | 7/2016 |
| WO | WO-2016/135705 A1 | 9/2016 |
| WO | WO-2016/141491 A1 | 9/2016 |
| WO | WO-2016/149807 A1 | 9/2016 |
| WO | WO-2017/000061 A1 | 1/2017 |
| WO | WO-2017/054094 A1 | 4/2017 |
| WO | WO-2017/054095 A1 | 4/2017 |
| WO | WO-2017/136956 A1 | 8/2017 |
| WO | WO-2017/143435 A1 | 8/2017 |
| WO | WO-2017/152265 A1 | 9/2017 |
| WO | WO-2018/010009 A1 | 1/2018 |
| WO | WO-2018/014123 A1 | 1/2018 |
| WO | WO-2018/049523 A1 | 3/2018 |
| ZA | 2012/05093 B | 2/2014 |

OTHER PUBLICATIONS

"Chicago Fed Warned on High-Frequency Trading, Sec Slow to Respond," Reuters Hedgeworld, New York, NY. (Oct. 1, 2012), Hyperlink "https://search.proquest.com/docview/1081511083" https://search.proquest.com/docview/1081511083?accountid=14753, (4 pages).

"New Trading Platform to Tackle HFT,"Compliance Reporter, London, UK (Jul. 29, 2013), Hyperlink "https://search.proquest.com/docview/1430519512?accountid=14753" https://search.proquest.com/docview/1430519512?accountid=14753, (3 pages).

"Upstart Trading Platform Pitches itself as a Sanctum," Dow Jones Institutional News, New York, NY. Jul. 29, 2013, Hyperlink "https://search" https://searchproquest.com/docview/2092612293?accountid=14753. (3 pages).

Ivy Schmerken, PDQ ATS Launches a New Electronic Equity Auction for Large Orders, 1-4 pages, Sep. 22, 2014, InformationWeek WallStreet & Technology, http://www.pdqats.com/pdq-ats-launches-a-new-electronic-equity-auction-for-large-orders/.

"Dan Marcus, Market structure evolution", 1-6 pages, Mar. 13, 2015, ParFx press release, https://www.parfx.com/news/press-releases/market-structure-evolution-by-dan-marcus-ceo-parfx/.

"Notice of Filing of Proposed Rule Change to Modify Exchange Rule 3307 to Institute a Five Millisecond Delay in the Execution Time of Marketable Orders on NASDAQ OMX PSX", 1-12 pages, Aug. 17, 2012, U.S. Securities and Exchange Commission. File No. SR-Phlx-2012-106 Release No. 34-67680, https://www.sec.gov/rules/sro/phlx/2012/34-67680.pdf.

(56) References Cited

OTHER PUBLICATIONS

About ParFx, 1-2 pages, Sep. 11, 2013, ParFx Web Site, https://web.archive.org/web/20130911210916/http://www.parfx.com/about-parfx.

Joe Castaldo, How Aequitas plans to build a kinder, gentler stock market, 1-12 pages, Mar. 26, 2015, Canadian Business http://www.canadianbusiness.com/innovation/aequitas-vs-hft/.

Greg Klein, HFT speed bump gets green light as OSC approves Aequitas Neo Exchange, 1-2 pages, Nov. 17, 2014, Resource Clips http://resourceclips.com/2014/11/17/hft-speed-bump-gets-green-light-as-osc-approves-aequitas-neo-exchange/.

Schematic (Auction Process)/PDQ ATS, 1 page, Sep. 30, 2015, PDQ Web Site, https://web.archive.org/web/20150930073841/http://www.pdqats.com/platform/process/.

Ivy Schmerken, EBSs Plan to Slow Down HFT in FX Could Influence Other Regulators, 1-2 pages, Apr. 29, 2013, InformationWeek WallStreet & Technology, http://www.wallstreetandtech.com/exchanges/ebss-plan-to-slow-down-hft-in-fx-could-influence-other-regulators/a/d-id/1268077.

Application for Recognition of Aequitas Neo Exchange Inc. (Aequitas Neo Exchange) and its parent company, Aequitas Innovations Inc. (Aequitas), of Notice and Request for Comment, 1-41 pages, Jun. 27, 2014, Ontario Securities Commission, https://www.osc.gov.on.ca/documents/en/Marketplaces/xxr-aequitas_20140627nrfc-application2.pdf.

Innovative Design to Promote Liquidity Formation, 1-2 pages, Apr. 5, 2015, Aequitas Neo Exchange Web Site, https://web.archive.org/web/20150405131256/https://www.aequitasneoexchange.com/en/trading/trading-solutions/neo-book/.

TMX Group to Streamline its Equities Trading Offering, 1-2 pages, Oct. 23, 2014, TMX Press Release, https://www.tmx.com/newsroom/press-releases?id=203&year=2014&month=10.

Third-party Submission Under 37CFR 1.290 for U.S. Appl. No. 14/688,463, filed Apr. 22, 2016, (18 pages).

Third-party Submission Under 37CFR 1.290 for U.S. Appl. No. 14/688,463, filed Apr. 22, 2016, (13 pages).

\* cited by examiner

FIG. 1A

Example 1A. Buy DPO with Limit Price Same as NBBO Midpoint

| (Unit: cents) | Bid | Midpoint | Offer |
|---|---|---|---|
| NBBO | 10 | 12 | 14 |
| Buy DPO @12 | Booked @10 | | |
| | Recheck up to 12 | | |

FIG. 1B

Example 1B. Sell DPO with Limit Price Same as NBBO Midpoint

| (Unit: cents) | Bid | Midpoint | Offer |
|---|---|---|---|
| NBBO | 10 | 12 | 14 |
| Sell DPO @12 | | | Booked @14 |
| | | | Recheck down to 12 |

FIG. 2A

Example 2A. DPOs with Limit Less Aggressive than NBBO Midpoint

| (Unit: cents) | Bid | Midpoint | Offer |
|---|---|---|---|
| NBBO | 10 | 12 | 14 |
| Buy DPO @11 | Booked @10 | | |
| | Recheck up to 11 | | |
| Sell DPO @13 | | | Booked @14 |
| | | | Recheck down to 13 |

FIG. 2B

Example 2B. After NBO Drops

| (Unit: cents) | Bid | Midpoint | Offer |
|---|---|---|---|
| NBBO | 10 | 11←12 | 12←14 |
| Buy DPO @11 | Booked @10 | | |
| | Recheck up to 11 | | |
| Sell DPO @13 | | | Booked @13 |
| | | | Recheck to 13 |

FIG. 2C

Example 2C. After NBO Rises

| (Unit: cents) | Bid | Midpoint | Offer |
|---|---|---|---|
| NBBO | 10→12 | 12→13 | 14 |
| Buy DPO @11 | Booked @11 | | |
| | Recheck to 11 | | |
| Sell DPO @13 | | | Booked @14 |
| | | | Recheck to 13 |

FIG. 3

Example 3. DPOs with Limit More Aggressive than NBBO Midpoint

| (Unit: cents) | Bid | Midpoint | Offer |
|---|---|---|---|
| NBBO | 10 | 12 | 14 |
| Buy DPO @13 | Booked @10 | | |
| | Recheck up to 12 | | |
| Sell DPO @11 | | | Booked @14 |
| | | | Recheck down to 12 |

FIG. 4

Example 4. (For Comparison) Midpoint Peg Orders (MPOs)

| (Unit: cents) | Bid | Midpoint | Offer |
|---|---|---|---|
| NBBO | 10 | 12 | 14 |
| Buy MPO @13 | | Booked @12 | |
| A Sell Order comes in @13 | | | Booked @12 |
| | | | (Executed w/ MPO @12) |
| Sell MPO @10 | | Booked @12 | |
| A Buy Order comes in @12 | (Executed w/ MPO @12) | | |

FIG. 5A

Example 5A. No Restriction during Quote Instability

| (Unit: cents) | Bid | Midpoint | Offer |
|---|---|---|---|
| Markets 1/2/3 | 10 | 12→12.5 | 14→15 |
| Markets 4/5 | 10 | 12 | 14 |
| Non-DPOs | *Buy orders @12 could be executed by Markets 4/5 @12* | | |

FIG. 5B

Example 5B. Restriction on DPO Execution during Quote Transition

| (Unit: cents) | Bid | Midpoint | Offer |
|---|---|---|---|
| Markets 1/2/3 | 10 | 12→12.5 | 14→15 |
| Markets 4/5 | 10 | 12 | 14 |
| DPOs | *DPOs can only be executed at NBB/NBO during quote transition* | | |

Order
Buy DPO @ 11; size 1,000; display 100

| Time | Displayed | | Non-Displayed | | | | |
|---|---|---|---|---|---|---|---|
| | Size | Booked at | Size | Recheck up to | Bid | Midpoint | Offer |
| t1 | 100 | 10.00 | 900 | 11.00 | 10.00 | 12.00 | 14.00 |
| t2 Sell 100 @10 | 100 | 10.00 | 800 | 11.00 | 10.00 | 12.00 | 14.00 |
| t3 | 100 | 10.20 | 800 | 11.00 | 10.20 | 12.10 | 14.00 |
| At t3, NBB changed from 10 to 10.20 and, as such, the bid price of the displayed portion refreshed to 10.20, as well |
| t4 Sell 100 @10.20 | 100 | 10.20 | 700 | 11.00 | 10.20 | 12.10 | 14.00 |
| t5 Sell 500 @ 10.50 | 100 | 10.20 | 200 | 11.00 | 10.20 | 12.10 | 14.00 |
| At t5, the sell order was matched with the non-displayed portion, which could recheck up to 11.00 |
| t6 | 100 | 10.20 | 200 | 11.00 | 11.20 | 12.60 | 14.00 |
| At t6, NBB changed from 10.20 to 11.20, but the bid price of the displayed portion did not refresh to 11.20 because it was limited to 11.00 |

FIG. 9

Order
Sell DPO @ 11; size 1,000; display 150

| Time | Displayed | | Non-Displayed | | | | |
|---|---|---|---|---|---|---|---|
| | Size | Booked at | Size | Recheck down to | Bid | Midpoint | Offer |
| t1 | 150 | 14.00 | 850 | 12.00 | 10.00 | 12.00 | 14.00 |
| t2 | 150 | 14.00 | 760 | 12.00 | 10.00 | 12.00 | 14.00 |

At t2, 90 units would be replenished from the non-displayed portion to the displayed portion, because only 90 of the previously displayed 150 units could be matched with the Buy order

| t3 | 150 | 13.70 | 760 | 12.00 | 10.20 | 11.95 | 13.70 |

At t3, NBO changed from 14 to 13.70 and, as such, the quoted ask price of the displayed portion refreshed to 13.70, as well

| t4 | 150 | 13.70 | 260 | 12.00 | 10.20 | 11.95 | 13.70 |

At t4, the Buy order was matched with the displayed portion and a part of the non-displayed portion, both of which could recheck down to 11.95

| t5 | 150 | 13.80 | 160 | 12.00 | 11.20 | 12.50 | 13.80 |

At t5, NBO changed from 13.70 to 13.80, and the quoted ask price of the displayed portion refreshed to 13.80, which is greater than the specified limit of 11.00

FIG. 10

SYSTEMS AND METHODS FOR PROCESSING FULL OR PARTIALLY DISPLAYED DYNAMIC PEG ORDERS IN AN ELECTRONIC TRADING SYSTEM

FIELD OF THE INVENTION

The present invention disclosed herein relates generally to apparatuses, methods, and systems for electronic trading and/or auction. More particularly, the present invention relates to apparatuses, methods and systems for order book management where a balance can be achieved between availability of information and misuse of information and, simultaneously, a balance can be achieved between aggressive trading and predatory trading where the latest information may be available to only some but not all market participants.

BACKGROUND OF THE INVENTION

In the prior, related applications, such as PCT International Application No. PCT/US13/59558, Applicant disclosed various innovations related to electronic trading and computer-implemented platforms/infrastructure to facilitate improvements in electronic trading. One goal of such innovations is to reduce or deter predatory trading behavior so as to maintain a fair marketplace for all participants big or small. In particular, it is one object of those innovations and the present invention to minimize or eliminate information leakage and the use of the same in unfair trading strategies such as order book arbitrage or latency arbitrage.

For example, as previously explained, in the U.S. there is no such thing as a single national security exchange in a single location—instead, a number of security exchanges exist and operate at different locations. Since numerous trades are executed at some or all of these exchanges at any given moment and it takes time for market data updates to propagate among the exchanges, the order books of all the exchanges cannot be perfectly synchronized and updated at all times. High-speed traders can take advantage of quote instabilities, when momentary discrepancies exist among order books of different exchanges for the same security, to conduct trades at stale price points and therefore reap benefits to the disadvantage of other market participants. Furthermore, these momentary discrepancies can be anticipated before they actually occur by, for example, receiving and processing real-time low-latency market data feeds that permit a high-speed market participant to understand developing conditions that typically precede, or are characteristic, of quote instability.

For another example, the conventional approaches by which order books are managed could also lead to information leakage. High-speed traders can use a number of tactics such as small orders or non-firm orders (e.g., "indications of interest," "discretionary orders," "negotiable orders," "non-firm quotations," or "immediate-or-cancel orders") to probe the order books of the exchanges. Once a trade confirmation or other feedback from an exchange indicates the existence of a large, hidden or non-displayed order, the high-speed traders could place additional trades to take advantage of such order.

As one technique for protecting a trading party from predatory trading strategies employed by some market participants, especially during certain periods when quotes for a particular security are experiencing rapid changes or transitions, Applicant's co-owned U.S. patent application Ser. No. 14/799,975, published as U.S. Patent Application Publication No. 2016/0055581A1 (the '581 publication) entitled "Dynamic Peg Orders in an Electronic Trading System," filed on Jul. 15, 2015, describes embodiments that facilitate and support a new type of trading orders called dynamic peg orders (DPOs) whose booking and execution behaviors can be dynamically varied in response to environmental market conditions.

Pursuant to certain predefined rules, the DPOs may be allowed to trade at more aggressive price levels if the market is relatively stable, and the DPOs can only trade at less aggressive price levels when the market is determined to be unstable. Environmental market conditions, such as price movements at other trading venues, may be monitored and used as a basis for varying and/or limiting price discretion for the qualified orders during booking and/or execution. Because the actual price at which a DPO can trade typically depends on the market conditions and may be determined only at the time of trading, the DPOs are usually not displayed. As such, they contribute very little, if at all, to the information available to the market participants.

Applicant's co-owned U.S. patent application Ser. No. 14/322,996, published as U.S. Patent Application Publication No. 2015/0073967A1 (the '967 publication) entitled "Transmission Latency Leveling Apparatuses, Methods and Systems," filed on Jul. 3, 2014, describes some disadvantages of a market in which little or no information about orders is available to the traders. The '967 publication also describes, however, some disadvantages of a market in which all orders are displayed, and describes an electronic trading system that can implement a semi-lit market. In a semi-lit market described in the '976 publication, more or less information may be made available to a trader based on the price and/or size of the trader's order. This technique cannot be easily applied to a DPO, however, because, as noted above, the actual price at which a DPO can trade typically depends on the market conditions and may be determined only at the time of trading. Each of the '581 publication and the '967 publication is incorporated herein by reference in its entirety.

SUMMARY OF THE INVENTION

Various embodiments described herein facilitate exercising discretion in a controlled manner while matching an order with a contra order. Specifically, discretion is permitted if the time period during which an order and a contra order are matched is determined to be a stable period, e.g., a period in which the prices are not fluctuating a rate greater than a selected threshold rate. Otherwise, discretion is limited. Such control of the exercise of discretion can compensate for discrepancies in information availability arising from differences in network, hardware, and/or software processing times. As such, the likelihood that a predatory trader would take undue advantage of discrepancy in information availability where certain information is available to that particular trader but not to other traders, can be minimized.

Various embodiments can also achieve a balance between sharing trading information with all traders so that they can make informed decisions, and allowing traders to make decisions independently, without being influenced or manipulated by other traders. To this end, an order is divided into two portions—a displayed portion and a non-displayed portion. Some information about the order is available from the displayed portion thereof, but complete information about the order is not shared with all traders. Order matching is first attempted with the displayed portion and, if the matching is unsuccessful or is incomplete with respect to the contra order, the matching may be performed with the non-displayed portion. If the displayed portion or a part thereof is matched, the displayed portion is replenished, so that a part of complete order information remains available to the other traders. Unlike some other techniques, where information available to a trader depends on the price and/or size of that trader's order, partial information about various orders is made available to all market participants in a controlled manner.

Accordingly, in one aspect a method is provided for operating a priority queue within an electronic trading system. The method includes dividing a received dynamic peg order (DPO) for an item of interest into a displayed DPO portion having a display size, and a reserved DPO portion. The received DPO can therefore be referred to as a fully or partially displayed DPO. The DPO is fully displayed if the display size is equal to the order size. If the display size is less than the order size, the received DPO is a partially displayed DPO. In a queue that is maintained in memory, and has a displayed queue portion prioritized over a non-displayed queue portion, the method includes entering: into the displayed queue portion, the displayed DPO portion at a quoted price, and entering into the non-displayed queue portion, the reserved DPO portion. The display size may be customizable for the received DPO. The quoted price may include a specified price. Alternatively, or in addition, the method may include computing the quoted prices based on, at least in part, a current national best price.

In some embodiments, each one of the displayed queue portion and the non-displayed queue portion is individually prioritized by a price of the item of interest in an order portion entered into the respective queue portion, and then by a time associated with the order portion entered. In various embodiments, if the received DPO is a buy order, the quoted price is a current national best bid (NBB) price; otherwise, the received DPO is a sell order and the quoted price is a current national best offer (NBO).

In some embodiments, the method further includes matching at least a part of the displayed DPO portion, e.g., 60 units out of 150, where 150 is the display size, and lot size is 100, with a received (or resting) contra order, e.g., of size 60. In addition, the method may include determining that size of a remainder portion is less than a lot size, e.g., 150−60=90<100, and transferring a part of the reserved DPO portion, e.g., 60 units, from the non-displayed queue portion into the displayed queue portion, forming a replenished displayed DPO portion therein, where the size of the replenished displayed portion does not exceed the display size. For example, a replenished displayed portion may include the remainder of 90 units and 60 units transferred from the non-displayed, reserved portion, so that the size of the displayed portion becomes 150 units, which is the display size in the foregoing example.

In some embodiments, the matching is performed at the quoted price. The method may include ascertaining, prior to performing the matching, that a size of the contra order is at least equal to a minimum number of units to match, as specified in the received DPO e.g., using a parameter defining the minimum number of units to match. In other embodiments, the matching is performed at a match price selected by applying a DPO matching rule. Applying the DPO matching rule may include determining by a processor that current time is associated with a period of stability, and selecting the match price within a range from a national best price through less aggressive of a limit associated with the DPO and a midpoint of national best bid (NBB) and national best offer (NBO) prices.

If the received DPO is of type buy, the limit associated with the DPO can be a specified number of minimum price variants (MPVs) (e.g., one, two, or more MPVs) below the midpoint. Otherwise, the received DPO may be of type sell, and the limit associated with the DPO is a specified number of MPV above the midpoint. If the received DPO is of type buy, the less aggressive of the limit associated with the DPO and the midpoint can be the lesser of the limit associated with the DPO and the midpoint. Otherwise, the received DPO may be of type sell, and the less aggressive of the limit associated with the DPO and the midpoint can be the greater of the limit associated with the DPO and the midpoint.

Applying the DPO matching rule may alternatively include determining by a processor that current time is associated with a period of instability and, if the received DPO is of type buy, a national best bid (NBB) price may be selected as the match price; otherwise, the received DPO can be of type sell, and a national best offer (NBO) price may be selected as the match price. The method may also include updating the quoted price based on an updated current national best price.

In some embodiments, the method may include matching at least a part of the reserved DPO portion with a received (or resting) contra order (e.g., of size 500) at a match price selected by applying a DPO matching rule. For example, the reserved DPO portion may include 900 units from an order of total size 1000, where display size is 100; of these 900 units, 500 are matched with the contra order. Applying the DPO matching rule may include determining by a processor that current time is associated with a period of stability, and selecting the match price within a range from a national best price through less aggressive of a limit associated with the DPO and a midpoint of national best bid (NBB) and national best offer (NBO) prices.

If the received DPO is of type buy, the limit associated with the DPO can be a specified number of minimum price variant (MPV) (e.g., one, two, or more MPVs) below the midpoint. Otherwise, the received DPO may be of type sell, and the limit associated with the DPO is a specified number of MPV above the midpoint. If the received DPO is of type buy, the less aggressive of the limit associated with the DPO and the midpoint can be the lesser of the limit associated with the DPO and the midpoint. Otherwise, the received DPO may be of type sell, and the less aggressive of the limit associated with the DPO and the midpoint can be the greater of the limit associated with the DPO and the midpoint.

Applying the DPO matching rule may alternatively include determining by a processor that current time is associated with a period of instability and, if the received DPO is of type buy, a national best bid (NBB) price may be selected as the match price; otherwise, the received DPO may be of type sell, and a national best offer (NBO) price may be selected as the match price. The method may include ascertaining, prior to performing the matching step, that a size of the contra order is at least equal to a minimum number of units to match, as specified in the received DPO.

In another aspect, a system is provided for operating a priority queue within an electronic trading system. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to divide a received dynamic peg order (DPO) for an item of interest into a displayed DPO portion having a display size, and a reserved DPO portion.

The instruction also configure a queue that is maintained in the memory module to have a displayed queue portion prioritized over a non-displayed queue portion. In addition, the instructions program the processing unit to enter into the displayed queue portion, the displayed DPO portion at a quoted price, and to enter into the non-displayed queue portion, the reserved DPO portion. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to facilitate operation of a priority queue within an electronic trading system. The instructions program the processing unit to divide a received dynamic peg order (DPO) for an item of interest into a displayed DPO portion having a display size, and a reserved DPO portion.

The instruction also configure a queue that is maintained in the memory module to have a displayed queue portion prioritized over a non-displayed queue portion. In addition, the instructions program the processing unit to enter into the displayed queue portion, the displayed DPO portion at a quoted price, and to enter into the non-displayed queue portion, the reserved DPO portion. In various embodiments, the instructions can program the processing unit to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which:

FIGS. 1A-5B show hypothetical examples illustrating an exemplary order entry and recheck methodology for dynamic peg orders according to embodiments of the present invention;

FIGS. 9 and 10 depict two examples, each one illustrating operations associated with dividing orders into displayed and non-displayed portions, recording those portions in respective partitions of a memory structure, and processing those orders across the partitions, according to various embodiments;

DETAILED DESCRIPTION OF THE INVENTION

Figure 6:
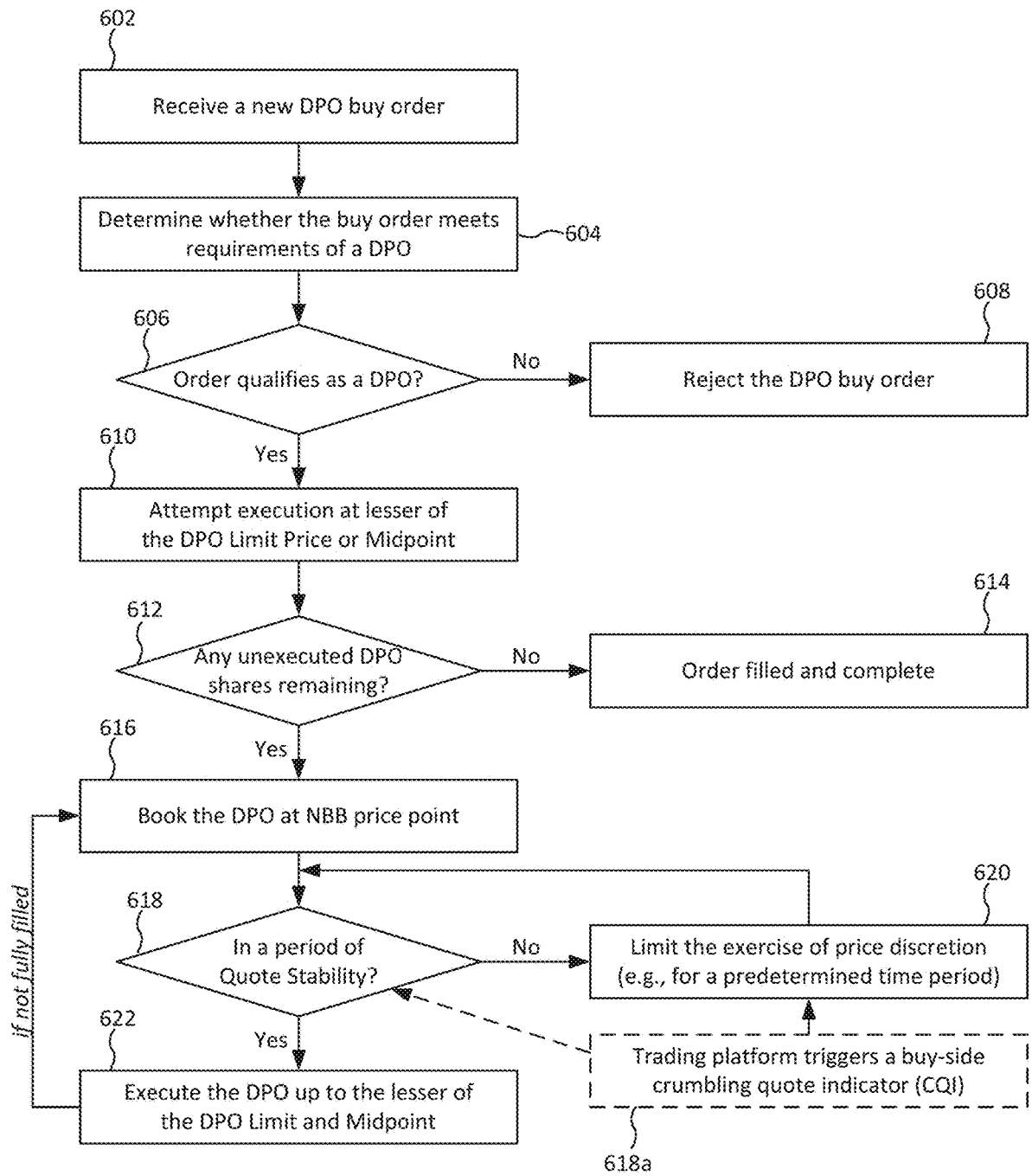
FIG. 6 is a flowchart illustrating an exemplary process and algorithm for processing a DPO buy order according to an embodiment of the present invention.

To further improve the fairness and efficiency of an electronic trading system (such as the TLL/POP facilitated trading platform previously disclosed in PCT International Application No. PCT/US13/59558), embodiments of the present invention introduce a new type of trading orders known as "dynamic peg orders" or "discretionary peg orders" (or DPOs) and related order entry and execution mechanisms. Dynamic peg orders are designed to change their processing and matching behavior in response to environmental market conditions. During certain environmental market conditions (e.g., during a period of quote stability), a DPO may be willing to trade at a more aggressive price; during other environmental market conditions (e.g., during a period of quote instability), the DPO may be willing to trade at a less aggressive price. The dynamically pegged (or booked) price points for a DPO may help protect the party who submitted the order from predatory trading strategies employed by some market participants.

According to some embodiments of the present invention, "dynamic peg orders" (or DPOs) may be limit orders having a trader specified starting or preferred price, or limit orders that are unpriced. The starting price of an unpriced limit order is automatically determined by the electronic trading system to be equal to the "national best bid and offer price" or NBBO (i.e., "national best bid" or NBB for buy orders, "national best offer" or NBO for sell orders). In some cases, the starting price can be a function of the NBBO, e.g., a specified number (one, two, or more) of minimum price variants (MPVs) above or below the NBB or NBO. In some embodiments, the DPO is split into a displayed portion and a non-displayed portion, and the displayed portion is displayed at a quoted price, which can be the starting price that is specified by the trader, or computed, as described above. The limit can be specified by the trader as an actual value or as a function of the NBBO, such as a midpoint of the NBBO, a specified number (one, two, or more) of MPVs above or below the midpoint, NBB, or NBO. The price at which trading may occur is also determined by the electronic trading system in a range from the trader-specified or the system-determined, NBBO based starting price up (for a bid) or down (for an offer) to the order's limit price, which also may be specified by the trader or may be determined by the electronic trading system, as described above.

Thus, the automatically determined price at which trading may occur can be, for a BUY order: a pre-selected, trader-specified or trading-system-determined lower limit, the mid-point of NBBO, or a pre-selected upper limit, which can also be trader-specified or determined by the trading system. For a SELL order, the trading can occur at a pre-selected, trader-specified or trading-system-determined upper limit, the mid-point of NBBO, or a pre-selected lower limit which can also be trader-specified or determined by the trading system. For BUY orders the pre-selected lower limit can be the NBB, a price that is a specified number of MPVs above or below the NBB, or another trader-specified price, typically greater than the NBB but possibly less than the NBB. The specified upper limit (i.e., the price up to which discretion could be exercised during a stable period) would generally be less than or equal to the mid-point. If the upper limit is greater than the mid-point, the mid-point may be applied as the upper limit. The upper limit can also be specified as one, two, or more MPVs below the mid-point.

For SELL orders the pre-selected upper limit can be the NBO, a price that is a specified number of MPVs below or above the NBO, or another trader-specified price, typically less than the NBO but possibly greater than the NBO. The specified lower limit (i.e., the price down to which discretion could be exercised during a stable period) would generally be greater than or equal to the mid-point. The lower limit can be specified as one, two, or more MPVs above the midpoint. According to certain implementations, a dynamic peg order will execute up/down to the midpoint (or another predetermined price point) against a contra-side order priced at the midpoint (or such other predetermined price point) or better, during a period of "quote stability" as determined by the electronic trading system. More generally, the electronic trading system may impose different booking or execution restrictions on a DPO, for example, by allowing it to execute in a first price range when quotes are unstable and allowing it to execute in a second, more aggressive price range when quotes are stable. According to other embodiments, rather than labeling it as a new order type, the order book entries and trade executions of an exchange may be simply implemented by an electronic trading system based on the above DPO methodology.

The IEX electronic trading system is an exemplary trading system in which the DPOs and related operations may be implemented according to one embodiment of the present invention.

Quote Stability

One example of "environmental market conditions" is a period of "quote stability" which refers to a time period when quotes are stable as the quotations for a symbol or security across many venues are holding steady and not changing. Such a period of "quote stability" may be defined in a number of ways. The restriction related to "quote stability"—that is, requiring either order to be one entered and/or marketable (i.e., priced at an immediately executable price) during a period of "quote stability"—increases the chance that DPOs are executed against contra-side orders at more aggressive prices only during situations when the market is stable, or at less aggressive prices when the quote is not stable, thereby reducing the chance of predatory trading strategies taking advantage of price dislocations during quote instability among the exchanges.

According to one embodiment of the present invention, a period when a quote is "unstable" may be defined as one where:

(# of near side venues)−2×(# of far side venues)>4

Here, for a particular security (e.g., Microsoft common stock MSFT), the "# of near side venues" refers to the total number of markets or trading venues (e.g., the 11 stock exchanges) each of which publishes a quotation on the near side of the DPO in question; "# of far side venues" refers to the total number of markets or venues each of which publishes a quotation on the far side of the DPO in question. The terms "near side" and "far side" are relative to the DPO in question where a far side quotation is on the contra-side of the DPO while the near side quotation is on the same side of the DPO. For example, for a buy DPO, another bid is on its near side at the NBB while an offer is on its far side at the NBO; for a sell DPO, another offer is on its near side at the NBO while a bid is on its far side at the NBB. The pronounced difference between the number of near side and far side quotations is an indication of quote volatility and/or a quote transition underway.

According to another embodiment of the present invention, a period when a quote is "unstable toward the bid" may be defined as one where (# of NBO venues)−2*(# of NBB venues)>4

Here, the "# of NBO venues" refers to the total number of markets or venues each of which publishes the NBO quotation for the subject of the DPO in question; the "# of NBB venues" refer to the total number of markets or venues each of which publishes the NBB quotation for the subject of the DPO in question. It is noted that, while there are currently 12 NBBO venues, any number of them from 1 to all 12 could have a quote at the NBBO, that is, at least one quoting at the NBB and at least one quoting at the NBO (but not necessarily the same venue quoting at both NBB and NBO simultaneously). According to an implementation of the present invention, a DPO might trade less aggressively when the quote is leaning in one specific direction (i.e. unstable while leaning in the direction of the order), or it might trade differently when the quote is unstable in either direction.

It should be noted that the above formulae are exemplary methods of defining a period of "quote instability" given the current number of quoting exchanges or venues. Other methods or criteria of determining or detecting a period of "quote instability" (or conversely, a period of "quote stability") may also be used.

In one embodiment of the present invention, a dynamic peg order is considered "active" when it has just arrived at the exchange or during an order book recheck (such as the recheck process implemented by IEX's trading system). In both instances the DPO is active when it is testing against contra-side orders resting in the order book. In one embodiment of the present invention once the DPO is booked, it is considered "resting" and may be eligible to execute with newly arrived or active contra-side orders or orders that are testing against or being rechecked against the order book.

Active Dynamic Peg Behavior

During order entry of an active DPO, the electronic trading system may test DPO against the order book (and execute the order) up to the order's limit or the midpoint, whichever is less aggressive. If any shares remain, then the DPO may be booked at the primary quote of the corresponding NBB (for a buy DPO) or NBO (for a sell DPO).

During an order book recheck, the DPO may be invited to execute up to the midpoint or the DPO limit price (whichever is less aggressive) assuming it is not a period of "quote instability."

Resting Dynamic Peg Behavior

According to embodiments of the present invention, a resting DPO can rest on the primary quote of NBB (for buy DPO) or NBO (for sell DPO) up to the order's limit. Resting DPOs may execute with active Limit, Market, Midpoint Pegged/Constrained orders and DPOs down/up to the active buy/sell order's limit, assuming it is not a period of "quote instability."

The hypothetical examples shown in FIGS. 1-5 illustrate the order entry and recheck methodology for DPOs. In each of the tables shown in FIGS. 1-4, the first row under the header row shows the national best bid/offer as well as midpoint prices for a hypothetical stock.

In Example 1A (shown in FIG. 1A), the NBB and NBO are 10 and 14 cents per share respectively, and therefore the NBBO midpoint is 12 cents per share. A DPO to buy shares at a limit price of 12 cents per share (same as NBBO midpoint) will be booked at NBB (i.e., 10 cents per share), but this buy DPO will be willing to recheck up to its limit price of 12 cents per share.

According to an alternative embodiment of the present invention, how the DPO is booked may depend on the environmental market conditions. For example, during a period of "quote stability," the DPO to buy shares at a limit price of 12 cents per share may be booked at the NBBO midpoint of 12 cents per share; during a period of "quote instability," this buy DPO may "back off" to the NBB of 10 cents per share.

Similarly, with the same NBBO price points, a DPO to sell shares at a limit price of 12 cents per share (same as NBBO midpoint) will be booked at NBO (i.e., 14 cents per share), but this sell DPO will be willing to recheck down to its limit price of 12 cents per share. This is illustrated in Example 1B (shown in FIG. 1B). According to an alternative embodiment, during a period of "quote stability," the DPO to sell shares at a limit price of 12 cents per share may be booked at the NBBO midpoint of 12 cents per share; during a period of "quote instability," this sell DPO may "back off" to the NBO of 12 cents per share.

In Example 2A (shown in FIG. 2A), the NBB and NBO are again 10 and 14 cents per share respectively, and therefore the NBBO midpoint is 12 cents per share. A DPO to buy shares at a limit price of 11 cents per share (less aggressive than NBBO midpoint) will be booked at NBB (i.e., 10 cents per share), but this buy DPO will be willing to recheck up to its limit price of 11 cents per share. Similarly, a DPO to sell shares at a limit price of 13 cents per share (also less aggressive than NBBO midpoint) will be booked at NBO (i.e., 14 cents per share), but this sell DPO will be willing to recheck down to its limit price of 13 cents per share.

If, as shown in Example 2B (FIG. 2B), the NBO subsequently drops from 14 to 12 cents per share, causing the NBBO midpoint to drop from 12 to 11 cents per share, then the sell DPO (at 13 cents) should be booked at its limit price of 13 cents per share and willing to recheck to the same price point because it has now become less aggressive than the NBO. The book entry and rechecking for the buy DPO (at 11 cents) remain the same. The buy DPO book entry (at 10 cents per share) remains the same but will now be willing to recheck up to 11 cents.

If, as shown in Example 2C (FIG. 2C), the NBB rises from 10 to 12 cents per share, causing the NBBO midpoint to rises from 12 to 13 cents per share, then the buy DPO (at 11 cents) should be booked at its limit price of 11 cents per share and willing to recheck to the same price point because it has now become less aggressive than the NBB. The sell DPO book entry (at 14 cents per share) remains the same but will now be willing to recheck down to 13 cents.

In Example 3 (FIG. 3), the NBB and NBO are again 10 and 14 cents per share respectively, and therefore the NBBO midpoint is 12 cents per share. A DPO to buy shares at a limit price of 13 cents per share (more aggressive than NBBO midpoint) will be booked at NBB (i.e., 10 cents per share), but this buy DPO will be permitted to recheck up to the NBBO midpoint of 12 cents per share. Similarly, a DPO to sell shares at a limit price of 11 cents per share (also more aggressive than NBBO midpoint) will be booked at NBO (i.e., 14 cents per share), but this sell DPO will be permitted to recheck down to the NBBO midpoint of 12 cents per share.

For comparison purpose, exemplary behavior of midpoint peg orders (MPOs) are shown in Example 4 (FIG. 4) while the NBB and NBO are 10 and 14 cents per share respectively and therefore the NBBO midpoint is 12 cents per share. MPOs are booked, and executable at, the NBBO midpoint regardless of quote stability/instability.

Examples 5A and 5B (shown in FIGS. 5A-5B) illustrate another benefit of the DPO methodology described above, namely the DPO rule which seeks to prevent execution at more aggressive prices with orders entered or that became marketable during a period of "quote instability." As shown in Example 5A (FIG. 5A), a hypothetical security is traded on Markets 1-5 which all started with the NBB and NBO at 10 and 14 cents per share respectively (therefore the NBBO midpoint is at 12 cents per share). If some of the markets (Markets 1-3) experience a change in the NBO from 14 to 15 cents per share (commencing a period of quote instability), the NBBO midpoint is anticipated to rise from 12 to 12.5 cents per share. Before the quotes on other markets (Markets 4 and 5) transition, predatory strategies could race to those markets and successfully execute orders at the potentially soon to be outdated midpoint of 12 cents per share. In contrast, the quote instability period could be detected by the electronic trading system according to embodiments of the present invention which could halt the execution of DPOs against orders at potentially soon to be outdated midpoints (i.e. more aggressive prices) entered during the quote transition period, thereby defeating a predatory strategy's attempt at order book arbitrage. However, DPOs may still be permitted to execute at less aggressive prices, for example at the NBB or NBO during the period of quote instability.

Computer-Implementation

The components used to implement embodiments of the present invention may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A plurality of software processing modules may be stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed microprocessor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown or described here, those of ordinary skill in the art will appreciate that such components and the interconnections are well known. Accordingly, additional details concerning the internal construction of the computer need not be disclosed in connection with the present invention.

In operation, a computer processor or the like in an electronic trading system may be configured with a special set of program instructions to recognize a dynamic peg order (DPO) and automatically perform the order entry, order book recheck, and trade execution functions consistent with the methodology described above.

Figure 8:
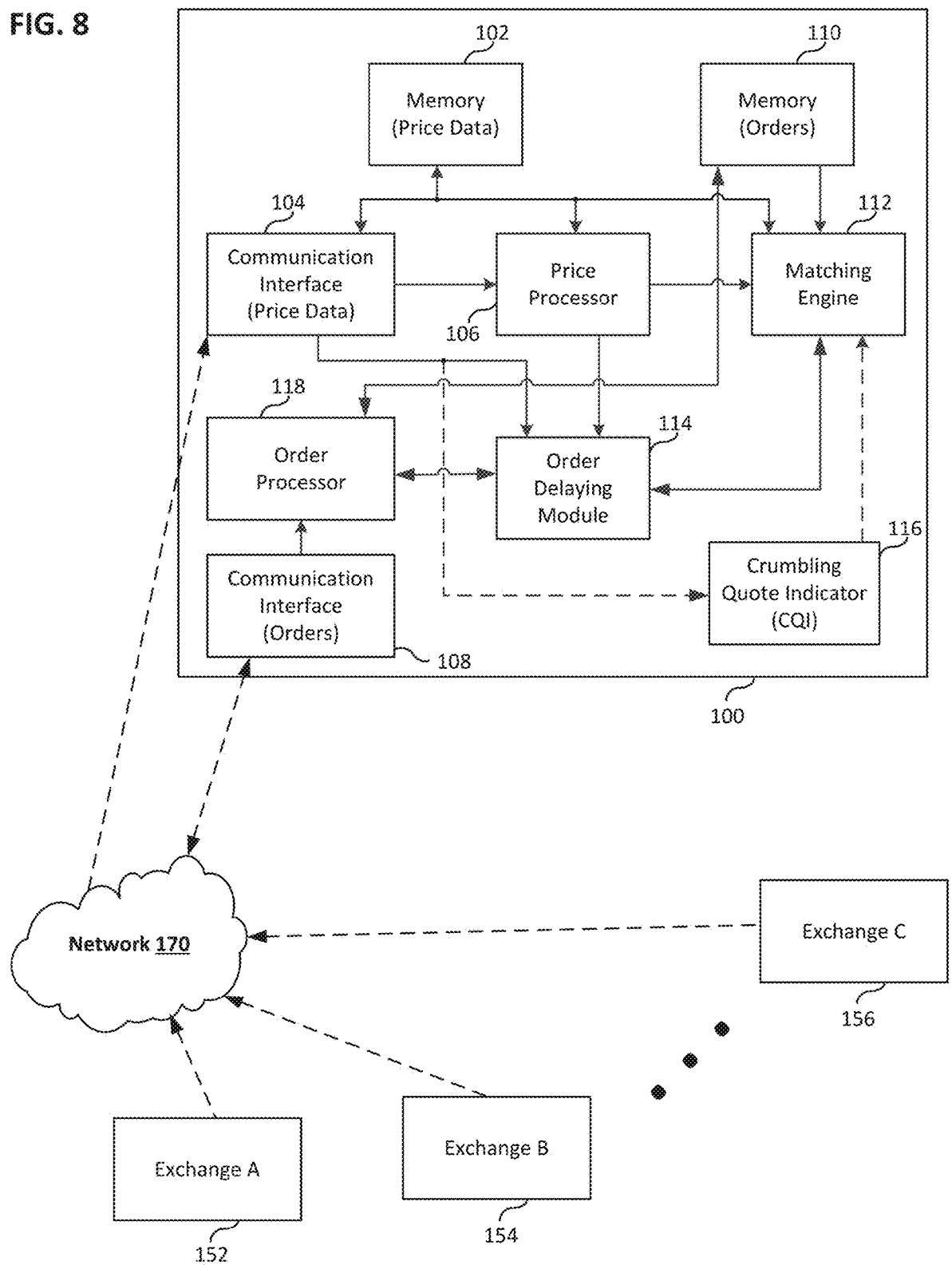
FIG. 8 schematically depicts an electronic trading platform implementing dynamic peg orders according to one embodiment, and a typical operating environment of such a platform.

More specifically, FIG. 8 shows a block diagram of an exemplary electronic trading platform 100 implementing dynamic peg orders according to one embodiment and a typical operating environment of such a platform.

The platform 100 allows various market participants to perform transactions relating to one or more items of interest. In some embodiments, the item of interest may be a security (e.g., a stock or a bond). In other embodiments, the item of interest may be an event ticket, a ticket for a service, and/or an article for sale. While the description below generally considers a security as the item of interest, this is only for the sake of convenience. The techniques described herein are applicable to various different types of items of interest identified above.

Typically for a security, at a particular instant of time the platform 100 has a price associated with that security. That price may be stored in a memory module 102. Events, such as trading events associated with the security, can occur at one or more venues such as Exchange A (152), Exchange B (154), and Exchange C (156), which can be trading exchanges, electronic communication networks (ECNs) registered as broker-dealers, alternative trading systems (ATSs) approved by a regulatory agency such as the U.S. Securities and Exchange Commission, private exchanges or forums for trading securities, generally known as dark pools, and/or alternative display facilities (ADF). The number of venues can be any number, e.g., 1, 2, 5, 6, 11, 15, etc. One or more of the events can affect the price of the security. Therefore, the platform 100 may receive data updates about such events from the one or more sources 162, 164, 166 through a network 170 (e.g., the Internet, a proprietary network, etc.), so that the platform can update the price of the security using the received event data. Data from different sources/venues may be received through different networks and/or networks of different types. Typically, the events continue to occur as time progresses and, hence, the event data may be received by the platform 100, via a communication interface 104, on an on-going basis.

After price data for a security (an item of interest, in general) is received from a source, that data is typically used to update a price of the security, such as in an order book maintained by the platform 100. To this end, the communication interface may store the price data in the memory module 102 and/or may forward that data to a price processor 106. In some embodiments, the price processor 106 can access the received data from the memory module 102. In various embodiments, the price processor computes an updated price for the security using the received price data, and may store the updated price in the memory module 102.

In different embodiments, the price processors 106 may have different architectures. For example, the price processor 106 may include a single processor or may include several processors performing price-updating computations in sequence and/or in parallel. One or more processors can be general purpose processors and/or specialized processors such as math co-processors. In some embodiments, one or more processors may include application specific integrated circuits (ASICs) and/or field programmable gate arrays (FPGAs). The price processor 106 may be implemented using hardware processors only, using hardware processors having embedded software, or using processors executing software instructions accessed from memory.

The platform 100 may also include a communication interface 108 for trading orders or transaction requests in general to be received from and/or routed to market participants and/or other venues. An order processor 118 may process the incoming trading orders or transaction requests, for example, by screening and sorting them into different order types. For instance, the order processor 118 may examine new orders to determine whether their content and format meet certain requirements and whether they qualify as dynamic peg orders or other types. With or without being processed by the order processor 118, the trading orders or transaction requests may be stored in a memory module 110.

In general, a matching engine 112, implemented using one or more processors and/or software, matches a transaction request received from one participant with one or more transaction requests that were previously received from one or more other participants. Such previously received transaction requests may be called orders resting on the order book or resting orders, and may be stored in the memory module 110. An order resting on the order book may rely on the platform 100 to provide the up-to-date price of a security and, as such, if an order based on the most up-to-date price is received from a high-speed trader before the platform has computed the most up-to-date price, the matching engine 112 may match the order using stale price information, giving the high-speed trader an undue advantage.

To prevent matching a transaction request based on the latest security-related information with a transaction request based on a stale price of the security, or to minimize the risk of permitting such an unfair match, the platform 100 may employ an order delaying module 114 that delays the transaction requests received by the communication interface 108 before they are forwarded to the matching engine 112 for matching. The forwarding delay may be introduced using a buffer implemented in hardware and/or software. The introduced forwarding delay is related to the communication delay and the processing delay that is determined or obtained by the platform 100.

By introducing this forwarding delay, the platform 100 can ensure, or at least increase the likelihood, that the price processor 106 has determined the true, up-to-date price of a security based on the latest information/data about the security, so that the matching engine 112 has knowledge of the up-to-date price when it attempts to match transaction requests. By delaying the requests, the platform 100 can make the up-to-date price of securities (items of interest, in general) available to all participants prior to matching their transaction requests, thereby reducing the likelihood that certain participant(s) can take an undue advantage of other participants.

Furthermore, to implement dynamic peg orders in accordance with embodiments described herein, a crumbling quote indicator module 116 may receive price data from other exchanges via the communication interface 104 and determine, based on the price data and a predetermined algorithm, whether a security is experiencing a period of quote instability. The result of the determination, such as a CQI signal, may be fed from the crumbling quote indicator module 116 to the matching engine 112 to vary the execution and order-book rechecking behaviour of DPOs.

Exemplary Rules Governing Dynamic Peg Orders

According to a particular embodiment of the present invention, a dynamic peg order or discretionary peg order may be defined and regulated in an electronic trading system with a detailed set of rules. For example, it may be specified that, upon entry, a DPO for a particular symbol or security is priced automatically by the trading system to be equal to the less aggressive price point of a Midpoint Price or the DPO's Limit Price (if any). Any unexecuted shares of such order are posted to the Order Book, priced to be equal to the primary quote or the order's Limit Price, and is automatically adjusted by the trading system in response to changes in the NBB (NBO) for buy (sell) orders up (down) to the order's Limit Price (if any). In order to meet the Limit Price of Active Orders on the Order Book, a DPO is allowed to exercise the least amount of price discretion necessary from the DPO's resting price on the NBBO to the less aggressive of the Midpoint Price or the DPO's Limit Price. While exercising price discretion, DPOs may be assigned a new timestamp at the discretionary price such that the time priority of the DPOs at the discretionary price can be determined with respect to other orders at that price point. After exercising price discretion, the DPOs may maintain their priority at their resting price.

More specific requirements for a DPO may include:
(A) Must be a Pegged Order.
(B) Must have a "Time In Force" (TIF) of "Market Hours Day" (DAY), "Good Till Time" (GTT), "Good Till Crossing" (GTX), System Hours (SYS) inclusive of pre-, post-, and primary session trading, "Fill or Kill" (FOK) or "Immediate or Cancel" (IOC), as described in Rule 11.190(c) of IEX Group's "Investors' Exchange Rule Book" available on the website of U.S. Securities and Exchange Commission (SEC).
(C) Must be IEX Only.
(D) May not be an Inter-market Sweep Order.
(E) May be submitted with a Limit Price or as an unpriced order.
(F) Are eligible to trade only during the Regular Market Session. As provided in Rule 11.190(a)(3)(D) of IEX Group's "Investors' Exchange Rule Book," any Pegged Order, which is marked DAY, submitted to the trading system before the opening of Regular Market Session will be queued by the trading system until the start of Regular Market Session; any Pegged Order, which is marked with a TIF other than DAY will be rejected when submitted to the trading system during the Pre-Market Session. Any Pegged Order submitted into the trading system after the closing of Regular Market Session will be rejected.
(G) May be a Minimum Quantity Order.
(H) May be an odd lot, round lot, or mixed lot.
(I) Eligible to be invited by the trading system to Recheck the Order Book to trade against interest resting at the Midpoint Price as described in Rule 11.230(a)(1) of IEX Group's "Investors' Exchange Rule Book."
(J) Eligible to exercise price discretion up to the discretionary price, except during periods of quote instability, as specified in paragraph (K) below.
(K) Quote stability is a measure of whether the exchange or market center believes the NBB (NBO) for a particular security is in the process of changing as indicated by its assessment of relative quoting activity of Protected Quotations at the current NBBO over a period of time.
(i) Quote instability may be determined by the trading system based on the following factors:
(a) The NBB and NBO are the same as the NBB and NBO one (1) millisecond ago; and
(b) The NBBO spread must be less than or equal to the thirty (30) day median NBBO spread during the Regular Market Session; and
(c) There are more Protected Quotations on the far side; i.e. more quotes on the NBO than the NBB for buy orders, or more quotes on the NBB than the NBO for sell orders; and
(d) The quote instability factor is greater than the quote instability threshold, as defined below.
(e) Quote Instability Coefficients. The exchange or market center utilizes the Quote Instability Coefficients below:
$C_0 = -2.39515$
$C_1 = -0.76504$
$C_2 = 0.07599$
$C_3 = 0.38374$
$C_4 = 0.14466$
(f) Quote Instability Variables. The exchange or market center utilizes the Quote Instability Variables defined below to calculate the current quote instability factor.
N. Number of Protected Quotations on the near side of the market, i.e. NBB for buy orders and NBO for sell orders.
F. Number of Protected Quotations on the far side of the market, i.e. NBO for buy orders and NBB for sell orders.
$N_{-1}$. Number of Protected Quotations on the near side of the market one (1) millisecond ago.
$F_{-1}$. Number of Protected Quotations on the far side of the market one (1) millisecond ago.
(g) Quote Instability Threshold. The exchange or market center utilizes a Quote Instability Threshold of 0.32.
(h) Quote Instability Factor. A proprietary method for calculating quote instability as defined by the following formula:

$$\frac{1}{1 + e^{-(C_0 + C_1 N + C_2 F + C_3 N_{-1} + C_4 F_{-1})}}$$

(ii) If the trading system determines the NBB for a particular security to be unstable in accordance with foregoing paragraph (i), it will trigger a crumbling quote indicator ("CQI") that restricts Buy DPOs in that security from exercising price discretion to trade against interest above the NBB up to and including the Midpoint Price. If the trading system determines the NBO for a particular security to be unstable in accordance with foregoing paragraph (i), it will trigger a CQI that restricts Sell DPOs in that security from exercising price discretion to trade against interest below the NBO down to and including the Midpoint Price.
(iii) CQI will remain in effect at that price level for ten (10) milliseconds.
(iv) The trading system will only trigger a CQI on one side of the market at a time in a particular security.

(v) The exchange or market center may modify the Quote Instability Coefficients and Quote Instability Threshold from time to time.

Exemplary Processes/Algorithms for DPO Buy/Sell Orders

Referring to FIG. 6, there is shown a flowchart illustrating an exemplary process and algorithm for processing a DPO buy order according to an embodiment of the present invention.

In Step 602, a new DPO buy order may be received by an electronic trading platform such as the one illustrated in FIG. 8. The new order may be a request to buy a certain amount of a specified security (e.g., common stock) typically at a specified price point (i.e., Limit Price). For example, the order may be a request to buy 500 shares of Intel Corporation's common stock (ticker INTC) at a Limit Price of $29 per share. The new order may further specify an order type of "DPO" ("dynamic peg order" or "discretionary peg order") or simply requests price discretion based on environmental market conditions.

In Step 604, the electronic trading platform (or its order processor or the like) may determine whether the buy order meets the requirements of a DPO. For example, the platform may parse the order parameters and automatically perform a compliance check against preset DPO rules. If it is decided in Step 606 that the buy order does not qualify as a DPO, then the DPO buy order may be rejected by the platform in Step 608.

If the buy order qualifies as a DPO, then the platform may attempt to execute the DPO buy order in Step 610 against corresponding sell orders available on the order book. The matching engine may try to execute the buy order, for as many shares as possible, at a price point that is the lesser of the DPO Limit Price or the current Midpoint Price. If, after this initial execution (Step 610), there are no unexecuted DPO shares remaining in Step 612, then the DPO buy order is recorded as filled and complete in Step 614. Any remaining, unexecuted DPO shares may be booked in Step 616 at the NBB price point.

In Step 618, it may be determined whether the security of interest is in a period of quote stability. This may be achieved by the trading platform monitoring the price movements of the security on the order books of a number of venues or exchanges and triggering a buy-side crumbling quote indicator (CQI) in Step 618a when the price data of that security meet predefined conditions.

If the security price is experiencing instability among the venues or exchanges (i.e., not in a period of quote stability), then the exercise of price discretion by the booked DPO buy order may be limited in Step 620. For example, a buy-side CQI indicating instabilities may remain in force for a predetermined period of time (e.g., a few milliseconds), causing the restriction of price discretion to continue for the same period of time.

When it is confirmed that the security price is in a period of quote stability (e.g., in the absence of a triggered buy-side CQI), the DPO buy order may be executed in Step 622 up to the lesser of the DPO Limit Price or Midpoint Price. As a result, the buy DPO is allowed two modes of price discretion: in a first mode, the price discretion is limited since the quotes are unstable or unsteady; in a second mode, the price discretion is less restricted since the quotes are more stable.

Figure 7:
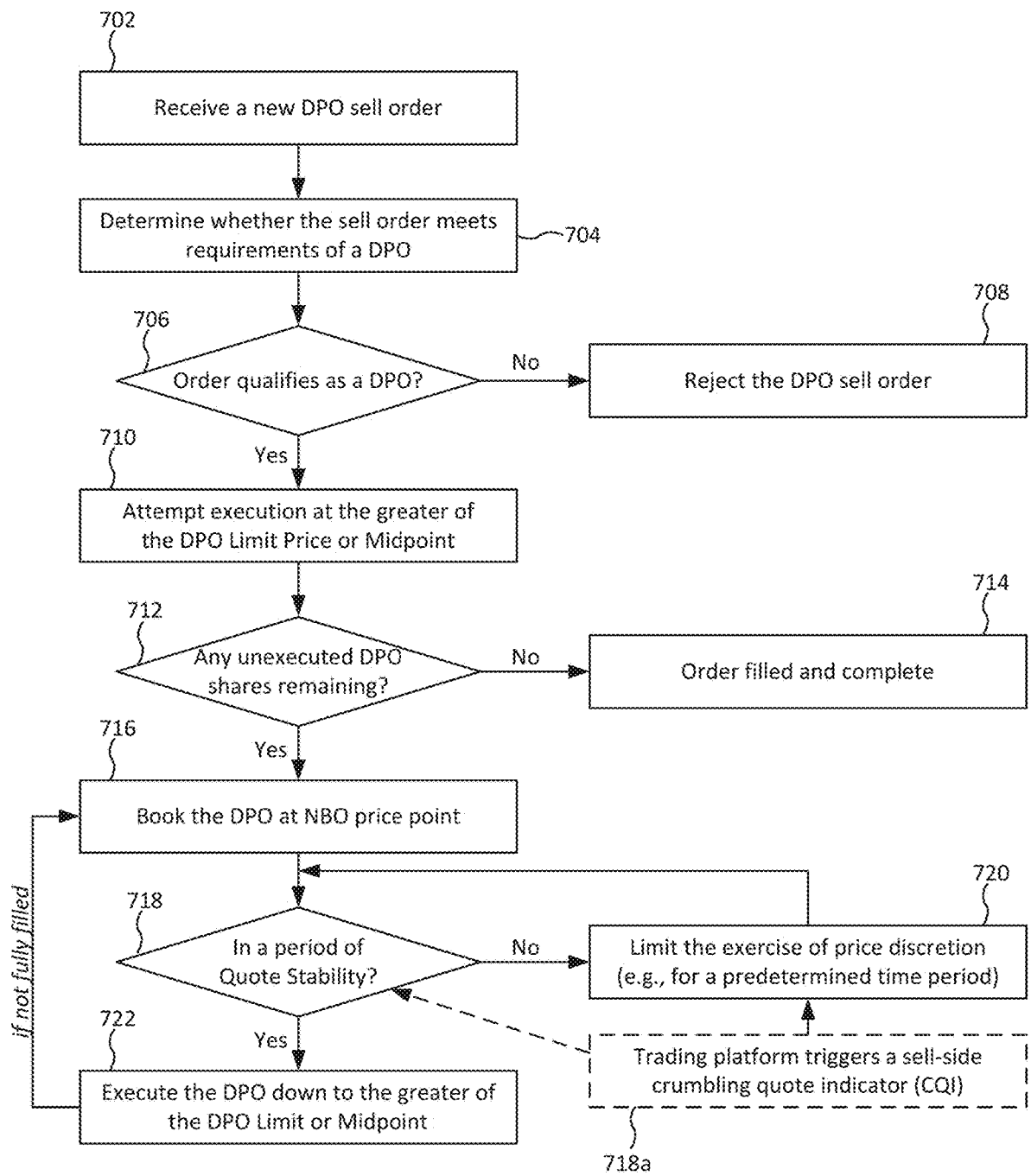
FIG. 7 is a flowchart illustrating an exemplary process and algorithm for processing a DPO sell order according to an embodiment of the present invention.

FIG. 7 is a flowchart illustrating an exemplary process and algorithm for processing a DPO sell order according to an embodiment of the present invention. The process/algorithm shown in FIG. 7 is similar to the one shown in FIG. 6, except that the parameter ranges are modified for the sell order in Steps 710 and 722.

With reference to FIG. 9, a Buy DPO with a limit of 11, size 1000 units, and display size 100 units, is received at time t1. At time t1, the NBB is 10.00 and the NBO is 14.00, with a midpoint of 12.00. The received order is split into two parts—a displayed portion and a non-displayed portion. In this example, the size of the portion to be displayed is not based on the price or the total size of the order. Instead, the size of the portion to be displayed is specified by the trader placing the order, using the parameter display size. The parameter display size may be specified as a percentage of the order size or as a function of the order size. In this example, at time t1, 100 units of the received order are displayed in the displayed or lit portion and the remaining 900 units of the received order are allocated to the non-displayed (also called reserved) portion.

The displayed portion of the received order is booked at the quoted price and, in this example, the quoted price is the NBB, i.e., the displayed portion is displayed at the price 10.00. The quoted price may be specified by the trader. Alternatively or in addition, the quoted price may be computed using the NBB for Buy orders and NBO for Sell orders and, optionally, also using a trader specified parameter according to which the quoted price is determined to be one or more MPVs above or below the NBB/NBO, as described above. The non-displayed portion of 900 units is a DPO with a limit of 11.00. In this example, the limit is specified in the received DPO as an actual price of 11.00. In some cases, the limit can be specified by the trader as a function of the NBBO, such as a midpoint of the NBBO, a specified number (one, two, or more) of MPVs above or below the midpoint, NBB, or NBO.

In various embodiments, the order book is prioritized such that the matching of a contra order (a sell order in this case) would be done using the displayed portion first. In some embodiments, the 100 displayed units can be traded at the NBB, i.e., at the price of 10.00. Thereafter, if more units of the contra order are outstanding, e.g., the size of the contra order is 200 units, those outstanding 100 units may be matched with a corresponding portion of the order allocated to the non-displayed portion.

In some embodiments, another parameter (referred to as min-quantity, for the sake of convenience only) is specified in a received DPO. The trader transmitting the DPO may provide a value of this parameter, which defines a minimum number of units that must be traded while matching the fully or partially displayed DPO with a contra order. Thus, if this parameter is specified, only those contra orders that have a size greater than or equal to the specified minimum number of units may be traded from the displayed portion and/or the reserved portion of the fully or partially displayed DPO.

Because the non-displayed portion of the received order is a DPO, during a time period determined to be stable, units from the non-displayed portion of the received order can be matched with the outstanding portion contra order at a price in the range from NBB up to the specified limit, i.e., from 10.00 up to 11.00. During a time period determined to unstable, however, units from the non-displayed portion of the received order can be matched with the outstanding portion contra order at the NBB price only, i.e., at 10.00 at time t1. In some cases, even though the displayed portion is booked at the NBB (i.e., at 10.00 at time t1), the matching can be performed according to the DPO rules, as described above.

In this example, a Sell order at a price 10.00, size 100 units is received at time t2 and, as described above, this order is matched with the displayed portion of the Buy order that was received at time t1. The matched or traded 100 units from the displayed portion are then replenished at time t2. Accordingly, the size of the non-displayed portion of the Buy order is now decreased to 800 units. In some embodiments, the replenished displayed portions of respective orders are updated and displayed at the latest national best prices, i.e., at the latest NBB for Buy orders and at the latest NBO for Sell orders. In the foregoing example, the NBB changed from 10.00 at time t2 to 10.20 at time t3. Therefore, at time t3 the displayed portion displays a Buy order at the latest NBB price of 10.20, at the display size of 100 units.

Had the NBB not changed at time t3, the displayed portion would have displayed the Buy order at the latest NBB price, which would have remained at 10.00, at the display size of 100 units. In some embodiments, the updated price of the displayed portion is not allowed to be more aggressive than the limit specified in the received order. For example, the Buy order received at time t1 has a limit of 11.00. If the NBB were to change to 11.05 at time t3, the price of the displayed portion would be the specified limit, i.e., 11.00 and not the more aggressive NBB price 11.05. Similarly, if a Sell order with a limit of 13.50 is received at a time when the NBO is 14, and if the NBO changes to 13.20, the price of the displayed portion of the Sell order would be the specified limit, i.e., 13.50 and not the more aggressive NBO price 13.20.

At time t4, another contra order, i.e., a Sell order for 100 units at the price 10.20 is received, and is matched with the displayed portion. The displayed portion is then replenished again, at the latest NBB of 10.20. Correspondingly, the size of the non-displayed portion is decreased to 700 units. At time t5, yet another contra order, a Sell order for 500 units at the price 10.50 is received. In some embodiments, this contra order is not matched with the displayed portion because of the price mismatch. The price of the new Sell order, however, is within the limit of the Buy DPO that was received at time t1. Therefore, if this time period is determined to be a stable period, discretion may be exercised with respect to the non-displayed portion. Specifically, at time t5, 500 units from the non-displayed portion are matched with the Sell order at the price thereof (i.e., 10.50).

At time t6, the NBB changed from 10.20 to 11.20. Because the new NBB is more aggressive than the specified limit of 11.00, in this example, the quoted price of the displayed portion is not changed and remains at 10.20. In some embodiments, the quoted price of the displayed portion is updated, but less aggressively, i.e., only up to the specified limit for Buy orders if the specified limit is less than the latest NBB, and only down to the specified limit for the Sell orders of the specified limit is greater than the latest NBO.

With reference to FIG. 10, a Sell DPO for 1000 units is received at time t1. While the lot size for the electronic trading system in this example is 100 units, the specified display size of the Sell DPO is different; it is 150 units. The specified price limit of the Sell DPO is 11, which is more aggressive than the current midpoint of NBB and NBO, which is 12.00 at time t1. Even during a period of time determined to be stable, i.e., when discretion is permitted, trades in the displayed and non-displayed portions of this Sell DPO would not occur at a price below the applicable midpoint of the NBB and NBO at the time of trading, e.g., not below 12.00 at time t1, regardless of the fact that the specified price limit is more aggressive than the midpoint (i.e., less than the midpoint for a Sell DPO and greater than the midpoint for a Buy DPO). During a period determined to be unstable, discretion is not permitted, and the Sell DPO can be matched with a contra order (a Buy order in this case) at the applicable NBO price only. In this example, during a period determined to be stable, discretion is allowed in both the displayed portion and the non-displayed portion.

After receiving the Sell DPO at time 1, it is split into two portions. A portion of units equal to the specified display size, i.e., 150 units, is displayed, and the remainder of 850 units is allocated to a non-displayed portion of the order book. The quoted ask price of the displayed portion is the current NBO, i.e., 14.00. At time t2, a contra order, i.e., a Buy order at a price of 14.00 and a size of 90 units is received. The Buy order is matched with a part of the displayed portion and, as such, the displayed portion would now have 60 unmatched units remaining therein. Because the remainder is less than the lot size (100 units), the units that are traded, i.e., 90 units, are replenished from the non-displayed portion. As such, the displayed portion still has 150 units displayed, and the non-displayed portion now has 760 units.

At time t3, the NBO changed from 14 to 13.70 and, as such, the quoted ask price of the displayed portion is refreshed to the latest NBO 13.70. At time t4, a Buy order at a price of 13.00 for 500 units is received. In this example, both the displayed portion and the non-displayed portion can exercise discretion. The current time period was determined to be a stable period and, as such, 150 units of the Buy order were matched with the 150 displayed units at the price 13.00. This match price is different from the quoted ask price 13.70, but it is not less than the current midpoint of the NBB and NBO, which is 11.95 at time t4. The remaining 350 units of the Buy order are matched with 350 units of the non-displayed portion, also that the discretionary price 13.00. Then, the displayed portion is replenished by transferring 150 units from the non-displayed portion to the displayed portion. The quoted price (ask price because this is a sell order) of the displayed portion is 13.70, which is the NBO at time t4. The number of units remaining in the non-displayed portion at time t4 is 260.

If this time period were determined to be an unstable period, this discretion would not have been permitted. In other words, trading in both the displayed portion and the non-displayed portion would be permitted only at the NBO price at time t4, which is 13.70. Also, if the price of the contra Buy order were to be greater than the specified limit of the Sell DPO, (e.g., 11.50 which greater than the specified limit 11.00), but less than the midpoint at time t4 (i.e., 11.50<11.95), trading at that price would not be permitted in the displayed and non-displayed portions, regardless of whether the time period is determined to be stable or unstable. At time t5, the NBO changed from 11.70 to 11.80 and, as such, the quoted price of the displayed portion was refreshed to 11.80.

Figure 11:
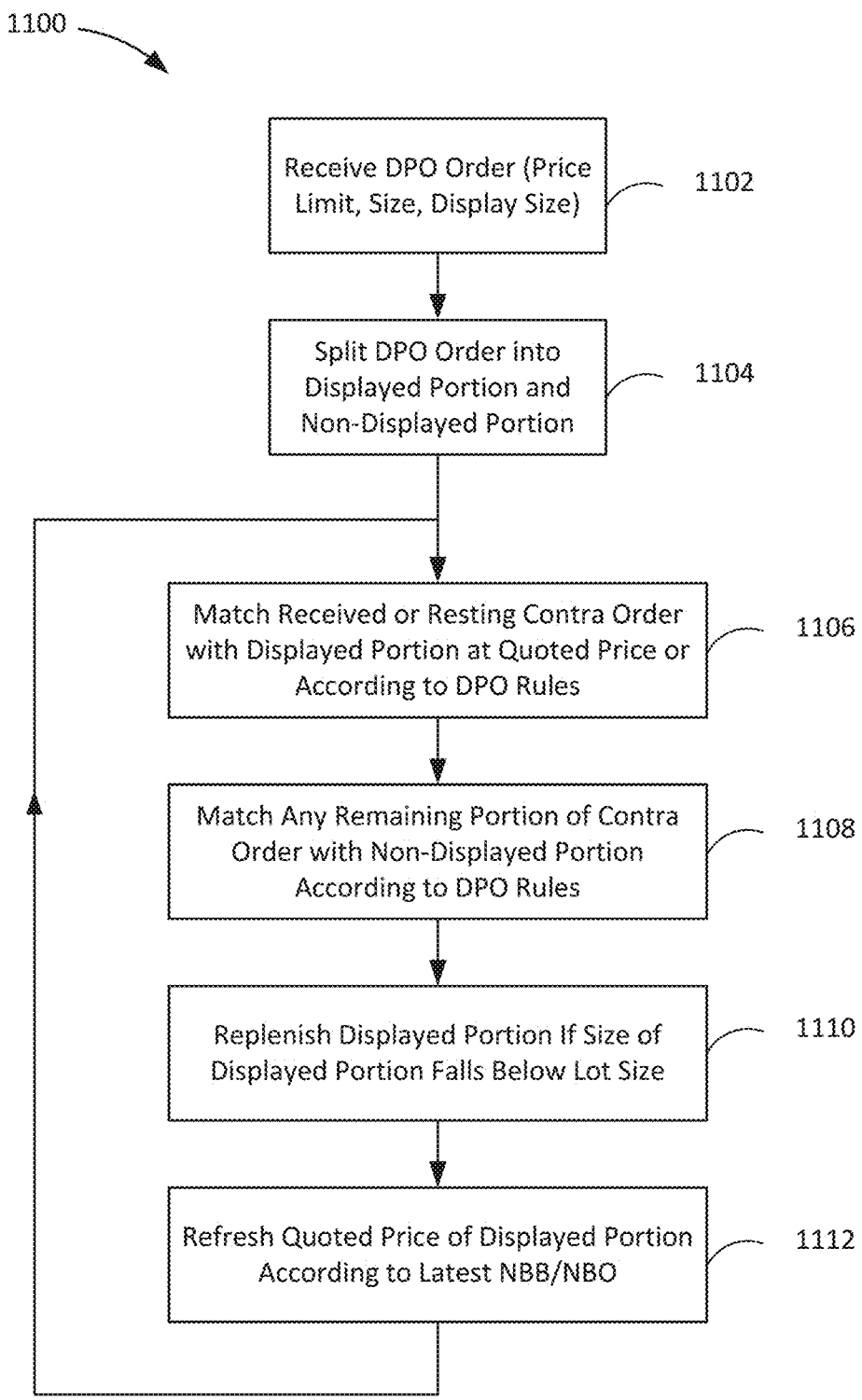
FIG. 11 is a flowchart illustrating an example process of dividing and matching orders, according to various embodiments.

In general, in a process 1100 depicted in FIG. 11, a DPO for an item to be traded (e.g., a security such as a stock or a bond, or a thing, or a service) is received at step 1102 at an electronic trading system. The DPO is specified using at least a price limit and an order size (e.g., a number of units). Typically a display size is also specified. In some cases, if the display size is not explicitly provided, the display size is assumed to be equal to a lot size at the electronic trading system. Different display sizes may be specified for different orders received at the electronic trading system.

At step 1104, the received DPO is divided into a displayed portion and a non-displayed portion. The number of units of the order that are allocated to the displayed portion is equal to the display size, and the remaining units are initially allocated to the non-displayed portion. In general, the price quoted for the displayed portion is a selected best price based on the order type. For example, for trades in securities, for Buy DPOs the quoted price is a bid price which can be equal to the NBB. For Sell DPOs the quoted price is an ask or offer price which can be equal to the NBO. In some embodiments, the received DPO or a portion thereof is traded with a resting contra order (or a portion thereof) prior to splitting the received order in step 1104. Such trading can occur according to the DPO rules described herein. Thereafter, any remaining untraded portion of the received DPO is divided into a displayed portion and a non-displayed portion, and those portions are matched with one or more contra orders, as described herein.

At step 1106, a newly received contra order or a resting contra order is matched with the order received at step 1102. The displayed portion is given priority over the non-displayed portion, in general. In some embodiments, matching with the displayed portion can occur at the quoted price only. In other embodiments, matching with the displayed portion can be performed according to the discretionary DPO matching rules described herein. A part of the contra order may remain unmatched, e.g., if matching with the displayed portion can occur only at the quoted price, which happens to be different from the price of the contra order. In this case, no part of the contra order would be matched with the displayed portion. In some cases, the quoted price and the price of the contra order may happen to be the same, but the size of the contra order may be larger than the display size. In other cases, discretion according to the DPO rules is employed while matching the contra order or a part thereof with the displayed portion, but the size of the contra order may be larger than the display size.

If any part of the contra order remains unmatched after step 1106, that unmatched part may be matched in step 1108 with the non-displayed portion of the order received in step 1102. The matching in step 1108 is performed according to the DPO rules. Any part of the contra order that may remain unmatched after step 1108 may be entered into the order book, e.g., according to the process 1100. If at least a part of the non-displayed portion remains unmatched after step 1108, the displayed portion may be replenished in step 1110. Specifically, a part of the non-displayed portion is transferred to the displayed portion, such that the total size of the displayed portion after the transfer in step 1110 is at most equal to the display size. In some embodiments, the transfer in step 1110 may not be performed if the size of the displayed portion is at least equal to the lot size.

In the optional step 1112, the quoted price of the displayed portion is refreshed if the selected best price based on the order type changes. For example, for trades in securities, for displayed portion of a Buy DPO, the quoted bid price may be updated to the latest NBB. For displayed portion of a Sell DPO, the quoted offer price may be updated to the latest NBO. The steps 1106-1112 may be repeated until the entire order that was received in step 1102 is matched with one or more contra orders.

Figure 12:
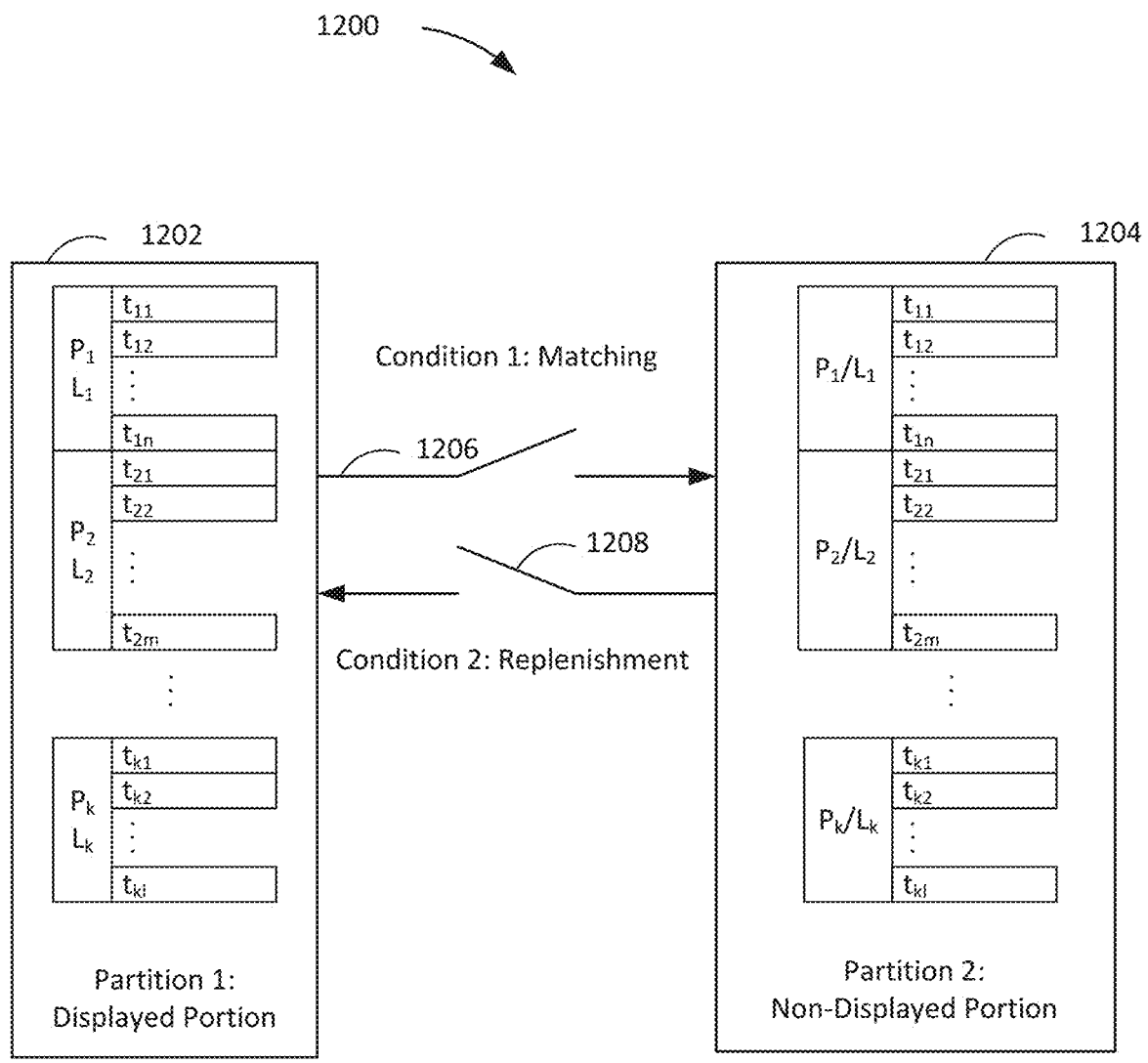
FIG. 12 schematically depicts a memory structure facilitating division and matching of orders, according to various embodiments.

With reference to FIG. 12, a memory structure 1200 customized to facilitate operation of the process 1100 (FIG. 11) includes two partitions: a displayed partition 1202 and a non-displayed partition 1204. The memory structure also includes two selectable pathways 1206, 1208. The selectable pathway 1206 allows matching of a contra order with the non-displayed (also referred to as reserved) portion of an order, if certain conditions are satisfied. Such conditions include the contra order could not be matched with the displayed portion due to price and/or size mismatch. The selectable pathway 1208 allows replenishment of the displayed portion up to a specified display size or a lot size.

In general, for any item of interest to be traded, orders may be received at different prices and/or trading limits. For DPOs, the limits of different orders can be different. Each order is divided into a displayed portion and a non-displayed portion, as described above. As such, for a particular item of interest the displayed portion 1202 of the memory structure 1200 may include several order portions, each one of which is associated with a respective quoted price $(P_1, P_2, \ldots, P_k,$ etc.) and/or respective specified price limits $(L_1, L_2, \ldots, L_k,$ etc.). If the quoted prices are updated to the latest NBB/NBO, the respective quoted prices may not be different.

At any particular price and limit, different orders may be received at different times. In some embodiments, such orders are maintained separately in the memory structure 1200. For example, for the price/limit combination $(P_1, L_1)$, orders were received at times $t_{11}, t_{12}, \ldots, t_{1n}$. Similarly, for the price/limit combination $(P_2, L_2)$, orders were received at times $t_{21}, t_{22}, \ldots, t_{2m}$, and for the price/limit combination $(P_k, L_k)$, orders were received at times $t_{k1}, \ldots, t_{kl}$. Such orders may be maintained separately but in association with the corresponding order price and price limit. In some cases, the quoted price may correlate with the time at which the order was received. These orders are divided, as described above, and the displayed order portion and the non-displayed order portion are respectively stored in the displayed partition 1202 and the non-displayed partition 1204.

In some embodiments, the orders may be sorted according to the price and then the time at which the order was received, and matching may be prioritized according to the sorted sequences. If matching is not performed, at least in part, with the displayed portion, matching may be attempted with a corresponding non-displayed portion of the order. Upon matching at least a part of the displayed portion of an order, that portion may be replenished, as described above.

Various specialized operations described herein facilitate exercising discretion in a controlled manner while matching an order with a contra order. Without the control provided by these operations, a predatory trader can take undue advantage of information available to that particular trader but not to other traders, where such discrepancy in information availability generally arises due to common characteristics of electronic trading systems such as differences in network delays, and/or differences in software execution delays due to differences in software and/or hardware components. In particular, discretion is permitted if the time period during which an order and a contra order are matched is determined to be a stable period, e.g., a period in which the prices are not fluctuating a rate greater than a selected threshold rate. Otherwise, discretion is limited. Such control of the exercise of discretion can compensate for discrepancies in information availability arising from differences in network, hardware, and/or software processing times and, is thus deeply rooted in computing and communication environment of electronic trading systems.

In addition to controlling discretion, various specialized operations described herein can also achieve a balance between sharing trading information with all traders so that they can make informed decisions and allowing traders to make decisions independently, without being influenced or manipulated by other traders. To this end, an order is divided into two portions—a displayed portion and a non-displayed portion. Order matching is first attempted with the displayed portion and subsequently with the non-displayed portion, as described above. If the displayed portion or a part thereof is matched, the displayed portion is replenished, as described above. The above-described balance is achieved, at least in part, using a customized, two-part memory structure, selective designation of matching operations to the two parts, and selective flow of data from one memory partition to another. This two-part memory structure and the specialized configuration thereof provides an improved computing system because without such a memory structure, achieving the balance described above is difficult, if not impossible.

Thus, one technical effect of various embodiments herein is to effectively compensate for discrepancies in information availability arising from differences in network, hardware, and/or software processing times. Another technical effect of various embodiments is a memory system that can control dissemination of information. Unlike any generic operations such as data transmission and reception, unlike usual computer functions such as storage and access of information, and unlike any ordinary mathematical or mental processes such as merely comparing and categorizing information, the unconventional operations described herein, are specifically orchestrated. Conventional techniques either prevent exercise of discretion entirely or provide uncontrolled discretion. Similarly, conventional techniques either disseminate all available information or do not disseminate any information at all, or allow access to information based on an inferred measure of a trader's interest in the trade, which is estimated from the order price and/or size. As discussed above, various embodiments facilitate control of discretion and/or control of information dissemination that can be customized by a trader for each order.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. A method for operating a priority queue within an electronic trading system, the method comprising:
   at an electronic trading platform, dividing a received dynamic peg order (DPO) for an item of interest into a displayed DPO portion having a display size, and a reserved DPO portion, the received DPO having a trading price that is a function of a market condition; and
   providing a memory structure at the electronic trading platform, the memory structure comprising: (i) a first partition for maintaining a displayed queue, (ii) a second partition for maintaining a non-displayed queue, (iii) a first pathway prioritizing read access to the first partition over the second partition, and (iv) a second pathway selectively permitting write operation from the second partition into the first partition; and
   entering:
      into the displayed queue, the displayed DPO portion at a quoted price, and
      into the non-displayed queue, the reserved DPO portion,
   wherein:
      the first pathway allows access to data in the second partition of the memory structure, the data being contained in the non-displayed queue, only in response to a first condition comprising at least one of a price mismatch and a size mismatch, and
      the second pathway permits transfer of data from the second partition of the memory structure, the data being contained in the non-displayed queue, to the first partition of the memory structure for inclusion in the displayed queue, only in response to a second condition comprising order execution and removal of data from the displayed queue or failure to execute a pending order due to a price or size mismatch.

2. The method of claim 1, wherein at least one of:
   the quoted price comprises a specified price; and
   the display size is customizable for the received DPO.

3. The method of claim 1, further comprising computing the quoted price based on, at least in part, a current national best price.

4. The method of claim 1, wherein the displayed queue and the non-displayed queue both are individually prioritized by a price of the item of interest in an order portion entered, and then by a time associated with the order portion entered.

5. The method of claim 1, wherein:
   if the received DPO is a buy order, the quoted price is a current national best bid (NBB) price;
   otherwise, the received DPO is a sell order and the quoted price is a current national best offer (NBO).

6. The method of claim 1, further comprising:
   matching at least a part of the displayed DPO portion with a contra order;
   determining that size of a remainder portion is less than a lot size; and
   transferring a part of the reserved DPO portion from the non-displayed queue into the displayed queue, forming a replenished displayed DPO portion therein, size of the replenished displayed portion not exceeding the display size.

7. The method of claim 6, wherein the matching is performed at the quoted price.

8. The method of claim 6, further comprising, prior to performing the matching step:
   ascertaining that a size of the contra order is at least equal to a minimum number of units to match, as specified in the received DPO.

9. The method of claim 6, wherein the matching is performed at a match price selected by applying a DPO matching rule, applying the DPO matching rule comprising:
   determining by a processor that current time is associated with a period of stability, the period of stability being a time period during which a difference between buy and sell quotations for the item of interest is at most equal to a specified threshold; and
   selecting the match price within a range from a national best price through less aggressive of a limit associated with the DPO and a midpoint of national best bid (NBB) and national best offer (NBO) prices, wherein:
      if the received DPO is of type buy, the less aggressive of the limit associated with the DPO and the midpoint is lesser of the limit associated with the DPO and the midpoint; and
      otherwise, the received DPO is of type sell, and the less aggressive of the limit associated with the DPO and the midpoint is greater of the limit associated with the DPO and the midpoint.

10. The method of claim 9, wherein:
    if the received DPO is of type buy, the limit associated with the DPO is a specified number of minimum price variant (MPV) below the midpoint; and otherwise, the received DPO is of type sell, and the limit associated with the DPO is a specified number of MPV above the midpoint.

11. The method of claim 6, wherein the matching performed at a match price selected by applying a DPO matching rule, applying the DPO matching rule comprising:
   determining by a processor that current time is associated with a period of instability, the period of instability being a time period during which a difference between buy and sell quotations for the item of interest is not less than a specified threshold;
   if the received DPO is of type buy, a national best bid (NBB) price is selected as the match price; and
   otherwise, the received DPO is of type sell, and a national best offer (NBO) price is selected as the match price.

12. The method of claim 1, further comprising updating the quoted price based on an updated current national best price.

13. The method of claim 1, further comprising:
   matching at least a part of the reserved DPO portion with a contra order at a match price selected by applying a DPO matching rule.

14. The method of claim 13, wherein applying the DPO matching rule comprises:
   determining by a processor that current time is associated with a period of stability, the period of stability being a time period during which a difference between buy and sell quotations for the item of interest is at most equal to a specified threshold; and
   selecting the match price within a range from a national best price through less aggressive of a limit associated with the DPO and a midpoint of national best bid (NBB) and national best offer (NBO) prices, wherein
      if the received DPO is of type buy, the less aggressive of the limit associated with the DPO and the midpoint is lesser of the limit associated with the DPO and the midpoint; and
      otherwise, the received DPO is of type sell, and the less aggressive of the limit associated with the DPO and the midpoint is greater of the limit associated with the DPO and the midpoint.

15. The method of claim 14, wherein:
   if the received DPO is of type buy, the limit associated with the DPO is a specified number of minimum price variant (MPV) below the midpoint; and
   otherwise, the received DPO is of type sell, and the limit associated with the DPO is a specified number of MPV above the midpoint.

16. The method of claim 13, wherein applying the DPO matching rule comprises:
   determining by a processor that current time is associated with a period of instability, the period of instability being a time period during which a difference between buy and sell quotations for the item of interest is not less than a specified threshold; and
   if the received DPO is of type buy, a national best bid (NBB) price is selected as the match price; and
   otherwise, the received DPO is of type sell, and a national best offer (NBO) price is selected as the match price.

17. The method of claim 13, further comprising, prior to performing the matching step:
   ascertaining that a size of the contra order is at least equal to a minimum number of units to match, as specified in the received DPO.

18. A system for operating a priority queue within an electronic trading system, the system comprising:
   a first processor; and
   a first memory in electrical communication with the first processor, the first memory comprising instructions which, when executed by a processing unit at an electronic trading platform and comprising at least one of the first processor and a second processor, and in electronic communication with a memory module at the electronic trading platform and comprising at least one of the first memory and a second memory, program the processing unit to:
      divide a received dynamic peg order (DPO) for an item of interest into a displayed DPO portion having a display size, and a reserved DPO portion, the received DPO having a trading price that is a function of a market condition;
      configure in the memory module a memory structure comprising: (i) a first partition for maintaining a displayed queue, (ii) a second partition for maintaining a non-displayed queue, (iii) a first pathway prioritizing read access to the first partition over the second partition, and (iv) a second pathway selectively permitting write operation from the second partition into the first partition; and
      enter:
         into the displayed queue, the displayed DPO portion at a quoted price based on a current national best price, and
         into the non-displayed queue, the reserved DPO portion,
      wherein:
         the first pathway allows access to data in the second partition of the memory structure, the data being contained in the non-displayed queue only in response to a first condition comprising at least one of a price mismatch and a size mismatch, and
         permits transfer of data from the second partition of the memory structure, the data being contained in the non-displayed queue to the first partition of the memory structure for inclusion in the displayed queue only in response to a second condition comprising order execution and removal of data from the displayed queue or failure to execute a pending order due to a price or size mismatch.

19. The system of claim 18, wherein at least one of:
   the quoted price comprises a specified price;
   the instructions program the processing unit to compute the quoted price based on, at least in part, a current national best price;
   the display size is customizable for the received DPO; and
   the displayed queue portion and the non-displayed queue portion both are individually prioritized by a price of the item of interest in an order portion entered, and then by a time associated with the order portion entered.

20. The system of claim 18, wherein:
   if the received DPO is a buy order, the quoted price is a current national best bid (NBB) price;
   otherwise, the received DPO is a sell order and the quoted price is a current national best offer (NBO).

21. The system of claim 18, wherein the instructions further program the processing unit to:
   match at least a part of the displayed DPO portion with a contra order at one of: (i) the quoted price, and (ii) a match price;
   determine that size of a remainder portion is less than a lot size; and
   transfer a part of the reserved DPO portion from the non-displayed queue into the displayed queue, forming a replenished displayed DPO portion therein, size of the replenished displayed portion not exceeding the display size.

22. The system of claim 21, wherein the instructions program the processing unit to ascertain, prior to performing the matching operation, that a size of the contra order is at least equal to a minimum number of units to match, as specified in the received DPO.

23. The system of claim 21, wherein the instructions program the processing unit to:
perform the match at the match price selected by applying a DPO matching rule; and
to apply the DPO matching rule, the instructions program the processing unit to one of:
A1: determine that current time is associated with a period of stability, the period of stability being a time period during which a difference between buy and sell quotations for the item of interest is at most equal to a specified threshold; and
A2: select the match price within a range from a national best price through less aggressive of a limit associated with the DPO and a midpoint of national best bid (NBB) and national best offer (NBO) prices, wherein:
if the received DPO is of type buy, the less aggressive of the limit associated with the DPO and the midpoint is lesser of the limit associated with the DPO and the midpoint; and
otherwise, the received DPO is of type sell, and the less aggressive of the limit associated with the DPO and the midpoint is greater of the limit associated with the DPO and the midpoint; and
B1: determine that current time is associated with a period of instability, the period of instability being a time period during which the difference between buy and sell quotations for the item of interest is greater than the specified threshold;
B21: if the received DPO is of type buy, select a national best bid (NBB) price as the match price; and
B22: otherwise, the received DPO is of type sell, and select a national best offer (NBO) price as the match price.

24. The system of claim 23, wherein:
if the received DPO is of type buy, the limit associated with the DPO is a specified number of minimum price variant (MPV) below the midpoint; and
otherwise, the received DPO is of type sell, and the limit associated with the DPO is a specified number of MPV above the midpoint.

25. The system of claim 18, wherein the instructions program the processing unit to update the quoted price based on an updated current national best price.

26. The system of claim 18, wherein the instructions program the processing unit to:
match at least a part of the reserved DPO portion with a contra order at a match price selected by applying a DPO matching rule.

27. The system of claim 26, wherein to apply the DPO matching rule the instructions program the processing unit to one of:
A1: determine that current time is associated with a period of stability, the period of stability being a time period during which a difference between buy and sell quotations for the item of interest is at most equal to a specified threshold; and
A2: select the match price within a range from a national best price through less aggressive of a limit associated with the DPO and a midpoint of national best bid (NBB) and national best offer (NBO) prices, wherein:
if the received DPO is of type buy, the less aggressive of the limit associated with the DPO and the midpoint is lesser of the limit associated with the DPO and the midpoint; and
otherwise, the received DPO is of type sell, and the less aggressive of the limit associated with the DPO and the midpoint is greater of the limit associated with the DPO and the midpoint; and
B1: determine that current time is associated with a period of instability, the period of instability being a time period during which the difference between buy and sell quotations for the item of interest is greater than the specified threshold; and
B21: if the received DPO is of type buy, select a national best bid (NBB) price as the match price; and
B22: otherwise, the received DPO is of type sell, and select a national best offer (NBO) price as the match price.

28. The system of claim 27, wherein:
if the received DPO is of type buy, the limit associated with the DPO is a specified number of minimum price variant (MPV) below the midpoint; and
otherwise, the received DPO is of type sell, and the limit associated with the DPO is a specified number of MPV above the midpoint.

29. The system of claim 26, the instructions program the processing unit to ascertain, prior to performing the matching operation, that a size of the contra order is at least equal to a minimum number of units to match, as specified in the received DPO.

* * * * *